A. DRUMMOND.
ABUTMENT FOR THE LEAD SCREWS OF LATHES.
APPLICATION FILED JULY 27, 1921.
1,424,628.
Patented Aug. 1, 1922.
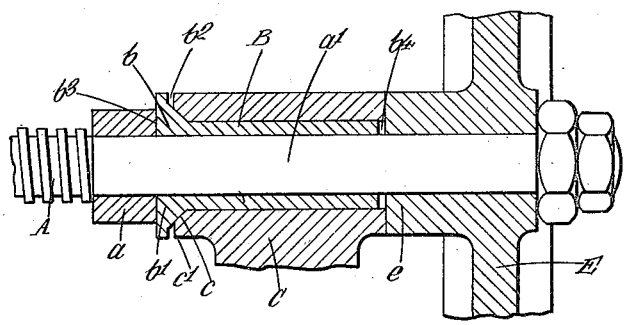

UNITED STATES PATENT OFFICE.

ARTHUR DRUMMOND, OF RYDE'S HILL, NEAR GUILDFORD, ENGLAND.

ABUTMENT FOR THE LEAD SCREWS OF LATHES.

1,424,628.  Specification of Letters Patent.  Patented Aug. 1, 1922.

Application filed July 27, 1921. Serial No. 487,976.

(GRANTED UNDER THE PROVISIONS OF THE ACT OF MARCH 3, 1921, 41 STAT. L., 1313.)

*To all whom it may concern:*

Be it known that I, ARTHUR DRUMMOND, a subject of the King of Great Britain, residing at Ryde's Hill, near Guildford, in the county of Surrey, England, have invented certain new and useful Improvements in or Relating to Abutments for the Lead Screws of Lathes, of which the following is a specification.

This invention relates to abutments for the lead screws of lathes, especially lathes having the bearings of the screw cast solid with the bed, where difficulty is found in machining the internal face of the bearing sufficiently true to receive the thrust of the screw without introducing periodic errors.

According to this invention I provide the bearing with a stationary sleeve having a flanged end which is accurately faced to receive the thrust from the abutment or collar on the lead screw and is formed with a small conical surface behind the said flange which fits in a conical seating formed at the inner face of the bearing.

In order that a lathe shall work accurately it is essential that the abutment of the lead screw shall have no appreciable axial movement as the screw rotates, but such accuracy is not easily obtainable with ordinary constructions as the formation of a flat face on a fixed bearing forming part of the bed of the machine, which face shall be exactly at right angles to the axis of the bearing, is effected only with the greatest difficulty. Any deviation from a plane at right angles to this axis causes what is known as a periodic error, that is, an error in the movement of the slide controlled by the lead screw which is repeated at every revolution of the screw. On the other hand no difficulty is found in forming a flat face on the end of a separate tubular sleeve very accurately at right angles to the axis of the sleeve, nor is there any difficulty in turning a conical seating and a conical flange respectively in the end of the bearing and on the sleeve, which conical surfaces are accurately co-axial with the sleeve axis. The difficulties hitherto found in forming a flat thrust surface exactly at right angles to the screw axis are, therefore, overcome by removing the surface required from the solid bearing to a separate sleeve member, which is stationary in the bearing and on the end face of which the abutment member of the lead screw bears.

In order that the said invention may be clearly understood and readily carried into effect, the same will now be described more fully with reference to the accompanying drawing, which shows in longitudinal section a bearing embodying this invention, with the end of the lead screw carried by the bearing.

A is the lead screw with collar or abutment $a$ and extension $a'$ projecting through the bearing. B is the stationary sleeve fitting in an aperture in the bearing C of the bed and provided with the flanged end $b$.

The bearing C is provided with the conical seating $c$ at its inner face and the stationary sleeve B is formed with a corresponding cone $b'$ fitting exactly in the conical seating. The flange $b$ is made so as to leave a small clearance $b^2$ between its rear surface and the face $c'$ of the bearing so that this face requires no machining and forms no part of the abutment.

The formation of the conical seating $c$ and the conical bearing face $b'$ of the sleeve B can be effected easily with a very high degree of accuracy and the conical surface may be made very short, all that is required being to prevent the stationary sleeve B being pushed back through the bearing C by the thrust. A substantial bearing surface at the face $b^3$ of the flange $b$ is provided for the screw abutment $a$ and this surface is easily made true to a high degree of accuracy with the bore of the sleeve through which the end $a'$ of the screw A extends. The support for the sleeve against the thrust of the screw is entirely at the conical face owing to the clearance $b^2$ behind the flange. The sleeve B is secured against rotation by a pin or other suitable means and does not extend completely through the bearing, so as to leave a clearance $b^4$ between its outer end and the boss *e* of the hand wheel E on the screw, where such hand wheel is provided.

What I claim and desire to secure by Letters Patent of the United States is:—

In a lathe, a lead screw, an abutment on the lead screw, a lead screw bearing having a conical seating at the abutment end, and a stationary sleeve in the said bearing, which sleeve is formed with an accurately faced flanged end adapted to receive the thrust of the screw abutment, the rear part of the flange having a small conical surface fitting closely in the said conical seating, whereby the necessary accuracy of the abutment support is obtained independently of the facing of the main bearing.

ARTHUR DRUMMOND.